W. I. TWOMBLY.
COUPLING OR UNION.
APPLICATION FILED MAY 3, 1910.
1,022,344.
Patented Apr. 2, 1912.
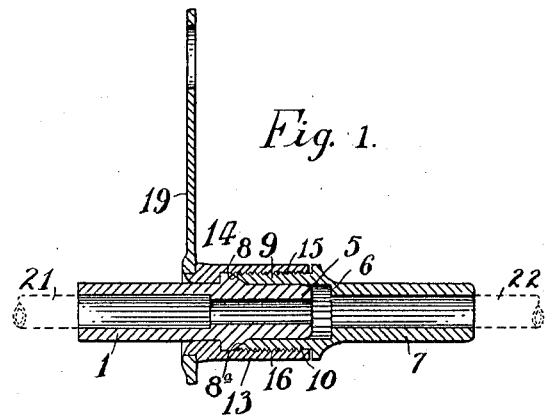
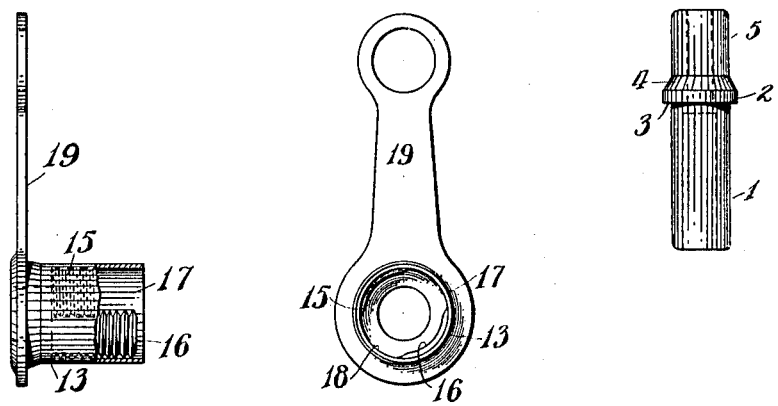
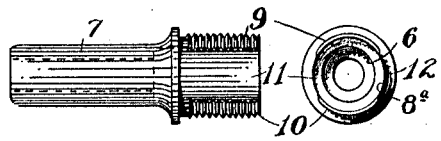
WITNESSES:
INVENTOR:
Willard Irving Twombly.
BY
John O. Seifert.
ATTORNEY

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

COUPLING OR UNION.

1,022,344. Specification of Letters Patent. Patented Apr. 2, 1912.

Application filed May 3, 1910. Serial No. 559,149.

*To all whom it may concern:*

Be it known that I, WILLARD IRVING TWOMBLY, a citizen of the United States, residing in the borough of Manhattan, in the city, county, and State of New York, have invented a new and useful Improvement in Couplings or Unions, of which the following is a specification.

This invention relates to couplings or unions for pipes and the like, and it is the object of the invention to provide a coupling which can be quickly coupled and uncoupled, and which is cheap in construction and efficient in operation.

In carrying out the invention I provide a pair of tubular members, one member having a flange one face of which is beveled or cone shaped, the other member having an internal bevel to correspond with and abut against the bevel on the flange of the other member and having a ground-joint connection therewith, a sleeve engaging over the abutting ends of the tubular members, said sleeve provided with an internal flange or shoulder with which the flange on the one tubular member engages, and having a "breech-block" connection with the opposite tubular member, a rotary movement of less than a quarter of a turn imparted to the sleeve serving to draw and lock the tubular members in fluid-tight connection, and a rotary motion of less than a quarter turn in a reverse direction uncoupling or disconnecting the same.

In the drawings accompanying and forming a part of this invention: Figure 1 is a sectional side elevation of my improved coupling. Fig. 2 is a side elevation partly in section of the coupling sleeve or nut. Fig. 3 is an end elevation of the coupling sleeve or nut. Fig. 4 is a side elevation of the coupling member shown at the left of Fig. 1. Fig. 5 is a side elevation of the coupling shown at the right of Fig. 1. Fig. 6 is an end elevation of the coupling member shown at Fig. 5, and Fig. 7 is a side elevation partly in section to illustrate the manner of sliding the coupling sleeve or nut over the coupling members.

The coupling comprises a pair of tubular members, the member 1 being the male member of the coupling and provided with annular flange or collar 2 one of the faces, as 3, of which is plane, and the other face 4 beveled or cone shaped, a portion of the said member extending beyond said cone portion, as at 5. The portion 5 of the member 1 engages in the end 6 of a companion tubular or female member 7, said member 7 being provided with an internal bevel $8^a$ in the end, as at 8, corresponding to and adapted to abut against the beveled face 4 of the flange 2 on the other member 1. The beveled face 4 on the flange 2 of the member 1 and the internal bevel $8^a$ in the end of the member 7 are ground to fit to form a ground-joint connection. The said member 7, is also provided with screw threads 9, 10, said screw threads extending around the outer circumference of said member for approximately ninety degrees and located at diametrically opposite sides thereof, the opposite cut away portions or spaces 11, 12 between said screw-threaded sections being plane and of less diameter than the outside diameter of the threads 9, 10.

A sleeve or nut 13 is adapted to engage over the ends of the members 1, 7, said sleeve having an internal flange or shoulder 14 against which the plane surface 3 of the flange on the member 1 abuts, and also provided with internal screw threads 15, 16 said threads extending around the inner circumference of said sleeve or nut for approximately ninety degrees thereof and located diametrically opposite, substantially the same as the threads 9, 10 on the member 7, the opposite cut away portions or spaces 17, 18 between said screw-threaded sections also being plane and of greater diameter than the outside of the threads. The threaded sections and plane sections on the sleeve 13 and on the member 7 comprises a breech-block connection between said sleeve and member 7. By imparting a slight rotary motion to the sleeve 13, less than one quarter of a turn, the threads 15, 16 will engage with the threads 9, 10 on the tubular member 7 and draw the bevel portion $8^a$ of the member 7 up against the bevel 4 of the annular flange 2 on the member 1 firmly clamping the member 7 in fluid-tight connection with the member 1.

To assemble the coupling, the member 1 is slipped into the sleeve 13, the plane surface 3 of the flange 2 abutting against the shoulder or internal flange 14 on said sleeve. The other member 7 is then slipped within the sleeve the threaded portions 9, 10 thereof sliding along the cut away or unthreaded portions 17, 18 of the sleeve and the threaded portions of the sleeve sliding along the unthreaded or cut away portions 11, 12 of the member 7 until the beveled end 8ª of said member 7 abuts against the bevel face of the flange 2 on the member 1, when a slight rotary motion of less than one quarter of a turn or ninety degrees is imparted to the sleeve by means of the handle or lever 19, (Fig. 1), or by means of a wrench applied to the hexagon portion 20 (Fig. 7,) to draw and lock said members 1 and 2 together in fluid-tight connection. To uncouple or disconnect the coupling it is only necessary to rotate the sleeve 13 in a reverse direction less than a quarter of a turn, when the threaded portions thereof are thrown out of engagement with the threaded portions on the member 7 and the said latter member may be slipped out from the sleeve 13, the threaded portions 9, 10 sliding along the plane or unthreaded portions 17, 18 of the sleeve 13.

Pipes, shown in dotted lines at 21 and 22 may be connected to the members 1 and 7 in any suitable manner, and in the present instance are shown as engaging in the bore thereof and sweated therein.

It will be obvious that instead of providing the member 7 with the oppositely-disposed screw threads 9, 10, and the sleeve portion with the internal screw threads 15, 16, they may be provided with three or more threaded sections with plane or unthreaded spaces between said threaded sections, and the same results obtained, that is a breech-block connection between the sleeve 13 and member 7.

Having thus described my invention, I claim:

A coupling or union, comprising in combination tubular male and female members, the male member having an annular flange one face of which is beveled and having a cylindrical extension forward of the bevel face, the female member having an enlarged portion at one end in which the forward extending portion of the male member engages and provided with an internal bevel in the end to engage with and have a ground-joint connection with the bevel on the flange of the male member, said enlarged portion of the female member also provided with external screw threads with the threads cut away at opposite points; a sleeve to engage over the connection of said male and female members, said sleeve having an internal annular shoulder to engage with the annular flange on the male member and provided with internal screw threads with the threads cut away at opposite points, so that the threaded portions of the sleeve may slide along the unthreaded portions of the female member and the threaded portions of the latter may slide along the unthreaded portions of the sleeve; and a lever connected to said sleeve portion to impart rotary motion to the sleeve to throw the threads thereon into engagement with the threads on the female member drawing the beveled portion of the female member up against the bevel on the annular flange of the male member and clamping the female member firmly against the extended portion of the male member, to couple and lock the members together in water-tight connection, or to apply a reverse motion to the sleeve to uncouple the male and female members.

WILLARD IRVING TWOMBLY.

Witnesses:
PAULA PHILIPP,
JOHN O. SEIFERT.

---

Copies of this patent may be obtained for five cents each, by addressing the "Commissioner of Patents, Washington, D. C."